Feb. 4, 1964  C. A. HUNTER, JR., ET AL  3,120,227
METHOD FOR OBTAINING A FETAL ELECTROCARDIOGRAM
Filed July 8, 1960
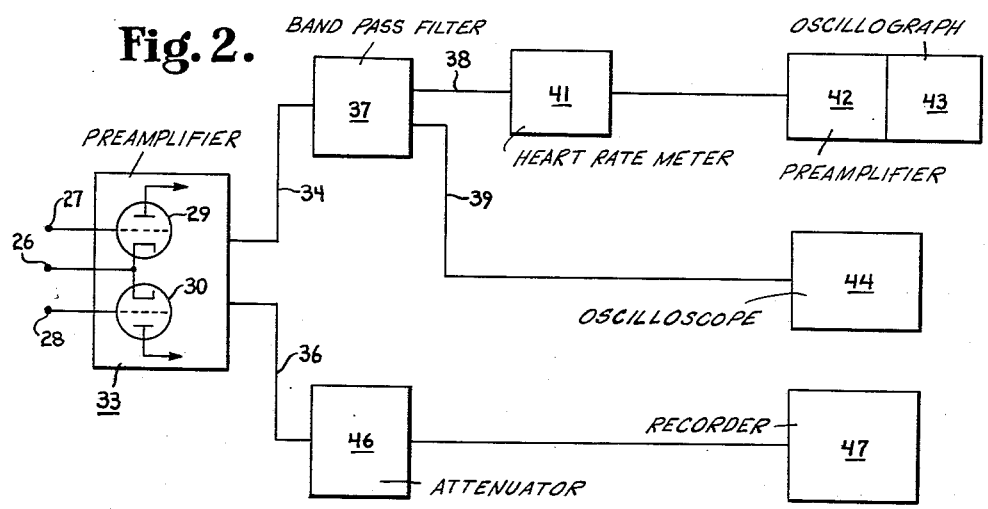
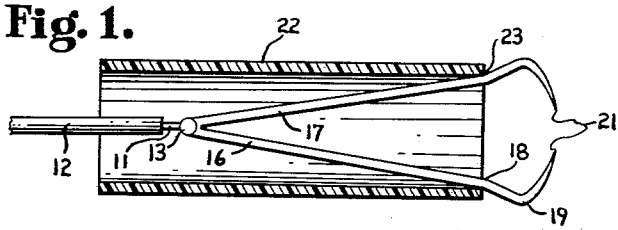
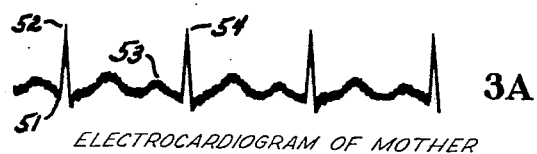
3A  ELECTROCARDIOGRAM OF MOTHER
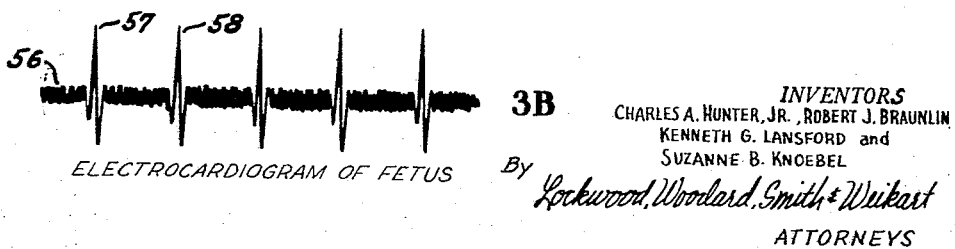
3B  ELECTROCARDIOGRAM OF FETUS
INVENTORS
CHARLES A. HUNTER, JR., ROBERT J. BRAUNLIN
KENNETH G. LANSFORD and
SUZANNE B. KNOEBEL
By Lockwood, Woodard, Smith & Weikart
ATTORNEYS – Patented Feb. 4, 1964

3,120,227
METHOD FOR OBTAINING A FETAL ELECTROCARDIOGRAM
Charles A. Hunter, Jr., Robert J. Braunlin, Kenneth G. Lansford, and Suzanne B. Knoebel, all of 1100 W. Michigan, Indianapolis, Ind.
Filed July 8, 1960, Ser. No. 41,591
3 Claims. (Cl. 128—2.06)

This invention is related generally to medicine, and more particularly to cardiology and obstetrics.

During the period of labor preceding child birth, it is desirable to be aware of the physical condition of the fetus so that if it appears to be impossible for the fetus to have a normal live birth, the baby may be delivered by a Cesarean section immediately. Prior hereto no reliable method has been available to provide during labor the information necessary to indicate whether or not a section will be necessary.

It is, therefore, an object of this invention to provide a method for indicating the condition of the fetus during labor and delivery.

It is another object of this invention to provide a method for obtaining an indication of the heart activity of the fetus during labor and delivery.

It is a still further object of this invention to provide a method for obtaining an indication of the heart activity of the fetus independently from that of the mother.

It is a still further object of this invention to provide a method for obtaining an electrocardiogram of the fetus only.

According to this invention, by sterile technique a novel electrode is made to pierce the skin of the fetus, usually the scalp. The electrode is coupled to electronic circuitry for amplification and indication of the fetal heart rate and to obtain the fetal electrocardiogram complex.

The full nature of the invention will be understood from the accompanying drawings and the following description and claims:

FIG. 1 shows a typical embodiment of the novel electrode used according to this invention.

FIG. 2 is a schematic diagram of the equipment used according to this invention.

FIG. 3 is an illustration representative of typical electrocardiograms obtained separately but simultaneously from both the mother and the fetus.

Referring to FIG. 1 there is shown an electrical conductor 11 covered with insulation 12. This conductor is connected at the junction 13 to a forcep-like portion having the branches 16 and 17 which diverge from the junction 13 and extend at a small angle with respect to each other to a point of sharp divergence as at point 18 on branch 16. From the point 18 the branches diverge for a short distance to a point such as 19 on branch 16, and then converge sharply and are terminated at their distal ends in sharp points 21. The branches 16 and 17 are usually made of spring steel and are joined at the junction 13 such that they will tend to be spread apart. A cylindrical sleeve 22 which is usually made of plastic is useful to position the branches 16 and 17 so that their distal ends are held in a grasping relationship. To accomplish this purpose, the plastic sleeve 22 is sized such that it can engage the branches at its end 23.

In FIG. 2 there is shown a set of terminals 26, 27 and 28 which are used to receive signals from electrodes employed as will be described hereinafter. These terminals are connected to the preamplifier 33 having a differential input stage indicated by the triodes 29 and 30. This preamplifier may, for example, be a Grass Model P5R A.-C. preamplifier. One output 34 from the preamplifier 33 is fed to the band pass filter 37. A Krohn-Hite Model 330-A is an example of a band pass filter which can be used successfully in this application. Two outputs are obtained from the band pass filter 37. A first output on conductor 38 is fed to a heart rate meter 41 from which an output is taken to a preamplifier 42 which is coupled in turn to an oscillograph 43. One example of a heart rate meter useful with this invention is a Waters Model C-224 cardiotachometer modified by the removal of the first two voltage amplifier tubes and injection of the input signal into the empty socket of the second voltage amplifier tube. Examples of a preamplifier and oscillograph useful in this invention are a Sanborn D.-C. coupling preamplifier Model 150-1300 and a Sanborn Model 150 oscillograph. The other output from the band pass filter 37 is fed to a cathode ray oscilloscope 44, such as for example, a Dumont Model 401AR equipped with a cathode ray tube having a P-7 phosphor.

The output from the preamplifier 33 through conductor 36 is coupled through a simple attenuator 46 to a recorder 47, such as, for example, a Sanborn Model 51 Viso-Cardiette.

Referring to FIG. 3 there is shown in FIG. 3A the electrocardiogram complex of the mother in which the ventricular activity is represented by the deflections such as at 52 and 54 and the auricular activity is represented by the deflections such as designated by reference character 53. FIG. 3B represents an electrocardiogram of the fetus taken at the same time and in which the ventricular activity is represented by the sharp peaks, two of which are designated by reference characters 57 and 58.

According to the method of this invention, the points 21 of the electrode shown in FIG. 1, are, by sterile technique, caused to pierce the fetal scalp at an area somewhat removed from the suture lines and fontanels. The electrode is held in place by advancing the plastic sleeve 22 over the portion 19 of the branches 16, 17 and clamping points 21 together. This is accomplished after rupture of the membranes and is more readily accomplished when the cervix has become approximately two centimeters dilated. If the fetal scalp is not accessible, the electrode may be attached to whatever portion of the fetus is accessible.

An electrode similar to the first is usually introduced into the material perineum at a point just lateral and anterior to the perineal body. An indifferent grounding electrode is usually but not necessarily attached to the maternal right leg, using a standard electrocardiograph electrode.

The input signal from the first electrode is applied to the terminal 27 of FIG. 2. The input to the preamplifier from the second electrode is applied at the terminal 28 and the input from the grounding electrode is applied to terminal 26 of FIG. 2.

With reference to the signals picked up by terminals 27 and 28, it should be noted that the signals picked up at these terminals are not the result of both the mother and the fetus. The reason for this is due to the location of the electrodes according to the novel technique of this invention. By connecting one of the two electrodes to the maternal perineum and connecting the other electrode to the fetus in the uterus at a point which is accessible by way of the vagina, both electrodes are at essentially the same potential with respect to the mother's heart. However, they are not at the same potential with respect to the baby's heart. Therefore, it is not necessary to process the signal input to terminals 27 and 28 with electronic equipment. The signal produced by the mother in the fetus and that produced by the mother at the maternal perineum is the same and, therefore, the input to the terminals 27 and 28 represents the operation of the baby's heart and not that of the mother or the combination of the mother and the baby.

Inasmuch as the preamplifier 33 has a differential input, it can provide a large order of amplification and has a low intrinsic noise generation. Accordingly a large signal amplitude can be produced by the preamplifier for use in the succeeding instruments, thus minimizing noise and shielding requirements.

While the method and apparatus described in the foregoing make possible obtaining the electrocardiogram and the heart rate of the fetus alone, a separate system can be employed simultaneously to obtain the electrocardiogram of the mother. The result of this procedure is represented in FIG. 3 where FIG. 3A shows the electrocardiogram for the mother and FIG. 3B shows that for the baby at the same time.

The modification of the cardiotachometer mentioned above is preferable to attenuating the signal input to the cardiotachometer and produces more reliable operation.

Inasmuch as the monitoring of the fetal heart is one of the most important aspects in the conduct of labor, the benefits derived by the practice of this invention are appreciated when one realizes also that heretofore no method has been available to obtain a fetal electrocardiogram during labor and delivery without the simultaneous interference of the material electrocardiogram. By elimination of the interfering material ECG and attenuation of voltage artifacts, reliable triggering of the rate meter by the fetal QRS complex may be effected continuously throughout labor and delivery. The fetal complex is distinct and provides for future interpretation of the fetal electrocardiogram relative to the components of the complex.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A method of monitoring the fetal heart and comprising the steps of: inserting a first electrode into the vagina of the mother; piercing the skin of the fetus with said first electrode at a point accessible through the vagina of the mother; connecting a second electrode to the body of the mother; and connecting indicating means to said electrodes.

2. A method of monitoring the fetal heart and comprising the steps of: inserting a first electrode into the vagina of the mother; piercing the skin of the fetus with said first electrode; connecting a second electrode to the maternal perineum at a point lateral and anterior to the perineal body; attaching a third electrode to the body of the mother for a ground; and coupling indicating means to said electrodes.

3. A method of monitoring the fetal heart and comprising the steps of: inserting a first electrode into the vagina of the mother; piercing the skin of the fetus with said first electrode; connecting a second electrode to the material perineum at a point lateral and anterior to the perineal body; and coupling indicating means to said electrodes.

References Cited in the file of this patent

UNITED STATES PATENTS

| | | |
|---|---|---|
| 2,419,682 | Guillemin | Apr. 29, 1947 |
| 2,611,368 | Pecora | Sept. 23, 1952 |
| 2,831,174 | Hilmo | Apr. 15, 1958 |

OTHER REFERENCES

Vara et al.: "Gynaecologia," vol. 132, pages 241–253, 1951.